J. G. BLESSING.
ALTERNATING CURRENT FREQUENCY METER.
APPLICATION FILED FEB. 19, 1917.

1,355,884.

Patented Oct. 19, 1920.
2 SHEETS—SHEET 1.

Inventor
John G. Blessing
By E. D. Fales.
Attorney

J. G. BLESSING.
ALTERNATING CURRENT FREQUENCY METER.
APPLICATION FILED FEB. 19, 1917.

1,355,884.

Patented Oct. 19, 1920.
2 SHEETS—SHEET 2

Inventor
John G. Blessing
By E. D. Fales.
Attorney

UNITED STATES PATENT OFFICE.

JOHN G. BLESSING, OF CHICAGO, ILLINOIS, ASSIGNOR TO AUTOMATIC ELECTRIC COMPANY, OF CHICAGO, ILLINOIS, A CORPORATION OF ILLINOIS.

ALTERNATING-CURRENT FREQUENCY-METER.

1,355,884. Specification of Letters Patent. Patented Oct. 19, 1920.

Application filed February 19, 1917. Serial No. 149,399.

*To all whom it may concern:*

Be it known that I, JOHN G. BLESSING, a citizen of the United States of America, and a resident of Chicago, county of Cook, and State of Illinois, have invented a new and Improved Alternating-Current Frequency-Meter, of which the following is a specification.

My invention relates to improvements in meters for determining the frequency or periodicity of alternating currents, and the objects of my improvement are to incorporate in one instrument a meter and a timing device for automatically throwing it in and out of circuit, thereby eliminating all chance for human error; to provide a frequency meter which is direct reading, thereby avoiding the necessity of computation; to provide a frequency meter operating on a very short time interval, and in which the indicating hand is automatically reset at the beginning of each operation, whereby readings may be taken with great rapidity; and to provide other improvements tending to increase the accuracy, efficiency, and general usefulness of a device of this character.

The foregoing and other useful objects are attained through means which will be fully described and explained hereinafter, reference being had to the accompanying drawings.

Figure 1:
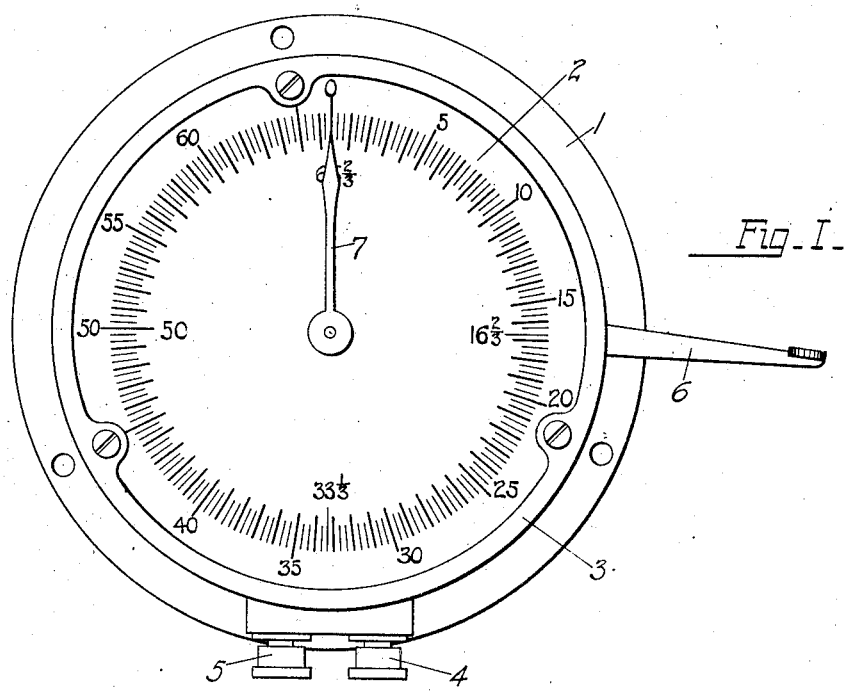
Figure 2:
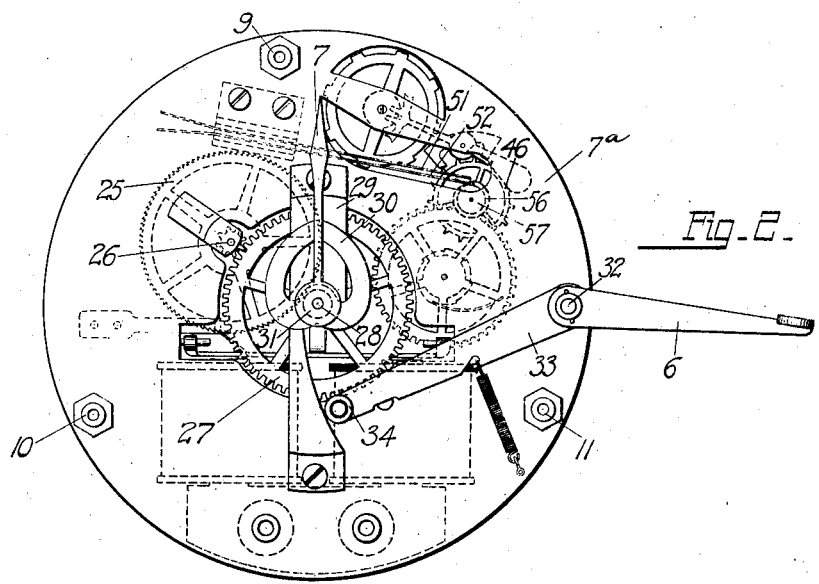
Figure 3:
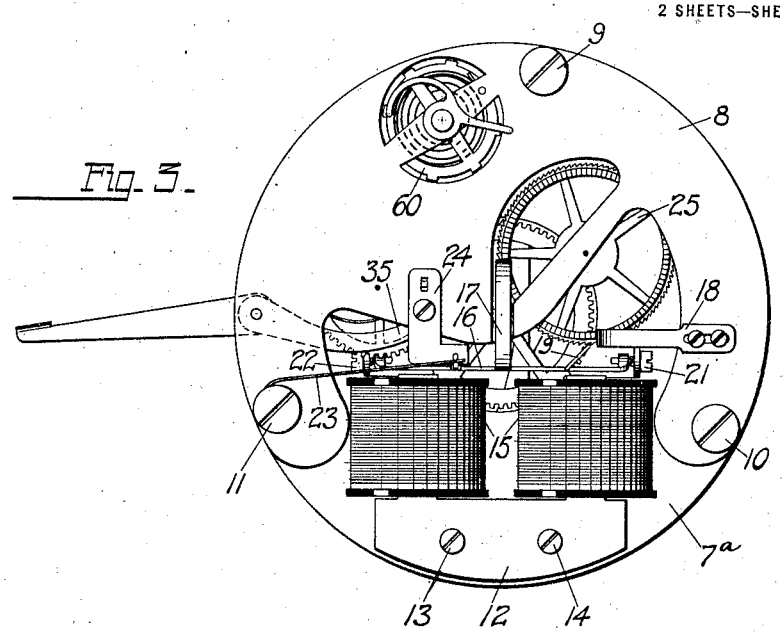
Figure 4:
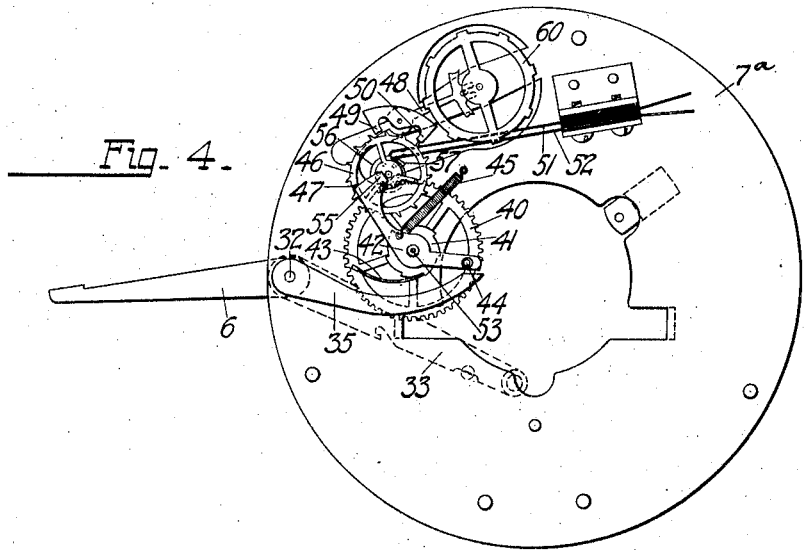

In the drawings, Figure 1 is a front view of my improved frequency meter, assembled and ready for use; Figs. 2 and 3 are front and back views, respectively, of the mechanism with the casing removed; and Fig. 4 is a view taken in the same direction as is Fig. 3, but having certain parts removed in order to show the timing device.

Referring to Fig. 1, in its prefered embodiment the invention comprises a flanged casing 1 containing the frequency meter proper, a numbered dial 2 mounted on the front of the casing, an indicating hand 7, and a glass front secured in place by the rim 3. Other exterior features are the operating lever 6, and the binding posts 4 and 5, by means of which latter the meter may be connected to the alternating current source whose frequency is to be ascertained.

When the casing is removed the meter mechanism itself appears in the form shown clearly in Figs. 2 and 3. The different parts are mounted in a frame comprising the front plate 7$^a$ (Fig. 2) and the back plate 8 (Fig. 3) which are separated the proper distance and rigidly connected by the bolts 9, 10, and 11. Holes are drilled opposite each other in the two frame plates to provide bearings for the shafts carrying the various gear wheels and levers, as is customary in ordinary clock-work. In fact, the meter mechanism resembles very much a common type of clock movement in its mechanical construction, and for this reason unnecessary details of well known expedients in this art will be omitted.

The frequency meter may very properly be divided into two distinct mechanisms. The first comprises the train of gears which are driven by the electro-magnet of the device for the purpose of operating the indicating hand 7, and constitutes a register for counting the number of alternations or cycles; while the second comprises a timing device which determines exactly the duration of the operation of the register. Through the coöperation of the timing device with the register a time element is introduced into the total registration, whereby the result may be read directly in cycles per second.

Considering the registering portion of the mechanism first and referring particularly to Fig. 3, the electromagnet of the device comprises a laminated core 12 and two coils 15. The core 12 is secured to the frame plate 7$^a$ by means of screws 13 and 14, heavy brass washers (not shown) being inserted between the core and the frame plate to provide a proper clearance for the magnet coils. The armature 16 is supported on pivot screws 21 and 22 which pass through studs formed of upturned portions of the frame plate 7$^a$. The armature is normally held against the adjustable stop 24 by a stiff spring 23, which latter is clamped under the head of the bolt 11. The armature 16 is preferably made as light as possible to reduce its inertia and thereby enable it to respond to currents of reasonably high frequency. Two pawls are provided which engage oppositely inclined sets of ratchet teeth on the ratchet wheel 25. The pawl 17 is the driving pawl. It advances the ratchet wheel 25 one step in a clock-wise direction for each energization and deënergization of the operating electro-magnet. The pawl 19 is provided to insure against overrunning of the ratchet wheel. Retrograde movement of the ratchet wheel is prevented by the spring 18 which engages the same set of ratchet teeth as does the pawl 17.

On the same shaft with the ratchet wheel 25 is mounted a pinion wheel 26 (Fig. 2) which meshes with the gear wheel 27. The gear wheel 27 is carried by the shaft 28, which has its lower bearing in the frame plate 8 (just behind pawl 17 in Fig. 3) and its upper bearing in the bridge 29. Just above the bridge 29 the shaft 28 has rigidly affixed to it a heart shaped cam 30, while above the cam, allowing amply sufficient space for the dial, is attached the indicating hand 7. It may be mentioned that when the device is assembled the dial is clamped against the ends of the bolts 9, 10, and 11, and is supported at the center by a hub 31 on the cam 30. The shaft 28 passes up through the dial and supports the hand 7 a short distance above it. While the cam 30 and the hand 7 are preferably rigid with the shaft 28, the gear wheel 27 is frictionally mounted thereon so as to permit restoration of the hand without movement of the gears. This restoration is accomplished by means of the operating lever 6, which also serves to store up power in and start the time mechanism as will be subsequently described. The lever 6 is rigidly mounted on a shaft 32, to which is also rigidly attached a lever 33 carrying at its extremity the roller 34. When the hand 7 is displaced from its normal position, and the lever 6 is pulled down, the roller 34 will engage the cam 30 and the hand is thereby returned to the position shown in Fig. 2.

Having described the mechanical construction of the registering portion of the frequency meter, I will now proceed to a consideration of the timing mechanism, reference being had particularly to Figs. 2 and 4. The timing device consists essentially of an escapement wheel 46, pallets 49 and 50 coöperating therewith, an escapement lever 48, and the balance wheel 60. Time mechanism similar to the above is well known and needs no detailed description. Power for driving the escapement is stored in the spring 45 and is communicated to the shaft on which the escapement wheel 46 is mounted through the medium of a member 42, the ratchet 41, a spring pawl 43, and the gear wheel 40, the latter being in mesh with a pinion mounted on the same shaft with the escapement wheel. More in detail the member 42 and ratchet 41 are rigidly mounted on the shaft 53, while the gear wheel 40 is loosely mounted on the same shaft. The spring 45 is normally under tension and holds the member 42 in the position shown in the drawing with its toe 55 resting against the escapement wheel shaft. In this position a pin 47 on the side of the escapement wheel rests against the end of member 42. The shaft 32 on which the operating lever 6 is mounted carries also a lever 35. When the operating lever is pulled down, the end of lever 35 engages a roller 44 on member 42 and rotates said member and also the ratchet wheel 41 in a counter clock-wise direction, thereby permitting the spring pawl 43 to engage another notch on the ratchet wheel. In this position of the member 42 the toe 55 thereof has moved far enough to the left to clear the pin 47 so that when the operating lever is released the mechanism begins to run, power being supplied by the tensioned spring 45 as before mentioned. The gear ratio between the gear wheel 40 and the pinion it engages is such that by the time the escapement wheel 46 (and its pinion) has made a complete rotation the member 42 will have returned to its starting point, and the escapement wheel is stopped by the engagement of its pin 47 with the end of said member. To sum up briefly, each time the operating lever is actuated the time mechanism is started, and it continues to run until the escapement wheel has made one complete rotation.

Mounted on the shaft which carries the escapement wheel 46 and its pinion are two cams 56 and 57 which are perhaps best seen in Fig. 2. These cams are provided for the purpose of controlling the contact springs 51 and 52. The end of spring 51 rides on the periphery of cam 57 while the end of spring 52 rides on the periphery of cam 56. Throughout the greater portion of its circumference cam 57 is lower than cam 56 whereby spring 51 is permitted to make contact with spring 52; but for a short distance, by reason of a depression in cam 56 and a projection on cam 57, the two cams are of equal height, and the contact springs are separated.

The operating magnet 15 is of course connected across the two binding posts 4 and 5 in series with the contact springs 51 and 52. When it is desired to test the frequency of an alternating current, connections are made to the binding posts 4 and 5 of the frequency meter and the operating lever 6 is depressed momentarily. This operation restores the indicating hand 7 to zero (if it is not already there) and also starts the time mechanism. Referring to Fig. 2, the cams 56 and 57 will be rotated in a clock-wise direction, and as soon as contact spring 51 slips off the projection on cam 57 the circuit of the magnet 15 will be closed. The registering mechanism instantly starts and continues to run until the contact spring 52 drops into the depression on cam 56, whereby the circuit is interrupted. This occurs just before the pin 47 on the escapement wheel engages the end of the member 42. Evidently now the hand 7 will have been moved while the meter was operating a distance corresponding to the frequency of the current source to which the meter was connected.

It follows that if the dial is properly calibrated the result may be read directly in cycles per second. Gear ratios and the proper time interval can be chosen to adapt the meter for testing any desired commercial frequencies with the maximum convenience; but, as shown in Fig. 1, it has been designed especially for testing the frequency of the ringing currents in harmonic signaling systems. These frequencies ordinarily are 16⅔, 33⅓, 50, and 66⅔ cycles per second. The gear ratios in the registering mechanism are as follows: ratchet wheel 25, 100 teeth; pinion 26, 8 teeth; and gear wheel 27, 64 teeth. With these values, it will require 800 actuations of the magnet 15 to bring about one complete rotation of the hand 7. Since the magnet 15 responds twice to each cycle (on both the positive and negative waves), one complete rotation of the hand 7 will indicate 400 cycles.

The time mechanism of the meter is carefully regulated so that the duration of the closure of contact springs 51 and 52 is exactly 6 seconds. Owing to the peculiar cam construction for closing and opening these springs, and owing also to the fact that the mechanism runs long enough to attain synchronism before the springs are closed, this regulation can be accomplished with great accuracy. The running time being 6 seconds, the dial is calibrated by dividing the total number of cycles corresponding to different positions of the hand by 6, the results representing corresponding frequencies, and being marked on the dial at such positions. For example, the number 400 represents the number of cycles required to produce one rotation of the hand. The number 400 divided by 6 gives as a quotient 66⅔, and the zero point on the dial is marked accordingly. Again, 300 cycles will produce just three-fourths of one rotation, and the dividing line between the third and fourth quadrants is therefore marked with the quotient obtained on dividing 300 by 6, which is 50. Other values may obviously be found in the same manner and the distance between them subdivided to give a complete scale.

It is to be understood, as before mentioned, that I do not wish to limit myself to the exact values herein specified, but contemplate the use of other time intervals and gear ratios as occasion may demand, in order to obtain dial calibrations suited to any commercial frequencies of alternating current.

Having described my invention, what I consider to be new and desire to have protected by Letters Patent will be pointed out in the appended claims.

What I claim as my invention is:

1. In a frequency meter, the combination with an indicating device and actuating means therefor comprising an electromagnet, of a circuit for said magnet, a time mechanism, manually operated means for winding said mechanism and for initiating the operation thereof, and means controlled by said mechanism effective after it has attained its normal speed for closing said circuit.

2. In a frequency meter, the combination with an indicating device and actuating means therefor comprising an electromagnet, of a circuit for said magnet, a time mechanism, manually operated means for winding said mechanism and for initiating the operation thereof, a circuit closing device controlled by said mechanism in its operation to close said circuit for a predetermined length of time, said circuit controller so adjusted as to hold the magnet circuit open until after said mechanism has reached its normal speed.

3. In a frequency meter, the combination with a frequency indicator, of alternating current mechanism including a magnet for actuating said indicator, a circuit for said magnet, and a time mechanism for closing and opening said circuit, and a device for winding the time mechanism and restoring the indicator to the starting point simultaneously.

4. In a frequency meter, the combination with a register calibrated in cycles per second, and having an indicator, of alternating current mechanism and a circuit for operating said mechanism, a time mechanism for closing and opening said circuit, and a device for winding the time mechanism and restoring the indicator to the starting point simultaneously.

5. In a frequency meter, the combination with an alternating current circuit and mechanism for counting the cycles therein having an indicator, of power operated mechanism for closing said circuit a definite length of time, whereby said counting mechanism registers directly in cycles per second, a hand operated member, and means controlled thereby for supplying energy to said mechanism and for restoring the indicator after its operation.

6. In a frequency meter, the combination with an indicating device, of mechanism including a magnet for operating said device, a circuit for said magnet, a time mechanism for closing and opening said circuit, a hand operated member, and means controlled thereby for winding the time mechanism and restoring the indicating device to its starting point.

7. In a frequency meter, the combination with an electric current frequency indicating device having an indicator, of mechanism including a magnet responsive to alternating current for moving said indicator, a circuit for said magnet, a time mechanism for closing and opening said circuit, and manually operated means for storing energy in said time mechanism and for initiating the operation of the same.

8. In a frequency meter, the combination with an electric frequency indicator, of alternating current mechanism including a magnet responsive to alternating current for setting said indicator, a circuit for said magnet, a time mechanism for closing and opening said circuit, and manually operated means for storing energy in said time mechanism and for initiating the operation of the same.

9. In a frequency meter, the combination with a register graduated in cycles per second, of alternating current mechanism and a circuit for operating said register, a time mechanism for closing and opening said circuit, and manually operated means for storing energy in said time mechanism and for initiating the operation of the same.

10. In a frequency meter, the combination with an indicating device, of mechanism including a magnet for operating said device, a circuit for said magnet, a time mechanism for closing and opening said circuit, manually operated means for starting said time mechanism, and means for returning said indicating device to zero whenever said manually operated means is actuated.

11. In a frequency meter, the combination with an indicating device, of mechanism including a magnet for operating said device, a circuit for said magnet, a time mechanism for closing and opening said circuit, manually operated means for storing energy in said time mechanism and for initiating the operation of the same, and means for returning said indicating device to zero whenever said manually operated means is actuated.

12. In a frequency meter, the combination with a frequency indicator, of alternating current mechanism including a magnet for setting said indicator, a circuit for said magnet, a time mechanism for closing and opening said circuit, manually operated means for storing energy in said time mechanism and for initiating the operation of the same, and means for returning said indicator to zero whenever said manually operated means is actuated.

13. In a frequency meter, the combination with a register graduated in cycles per second, of alternating current mechanism and a circuit for operating said register, a time mechanism for closing and opening said circuit, manually operated means for storing energy in said time mechanism and for initiating the operation of the same, and means for returning said register to zero whenever said manually operated means is actuated.

14. In a meter, a dial and a movable pointer, mechanism for setting said pointer, time mechanism for starting said setting mechanism, means for starting said time mechanism, and means for resetting said pointer whenever said time mechanism is started.

15. In a frequency meter, the combination with a dial and a pointer, of mechanism responsive to alternating current for setting said pointer in accordance with the frequency of the current, manually operated means for initiating the operation of said mechanism, and means for resetting said pointer whenever said manual means is actuated.

16. In a frequency meter, the combination with a dial and a pointer, of mechanism responsive to alternating current for setting said pointer in accordance with the frequency of the current, an operating member, means responsive to the actuation of said member for starting said mechanism, and means for resetting said pointer whenever said member is actuated.

Signed by me at Chicago, Cook county, State of Illinois, this 14th day of February, 1917.

JOHN G. BLESSING.